E. WIMP.
MOTOR CAR SIGNAL.
APPLICATION FILED MAR. 2, 1917.

1,381,382.

Patented June 14, 1921.
3 SHEETS—SHEET 1.

WITNESSES:

INVENTOR.
ELGY WIMP
BY
ATTORNEY

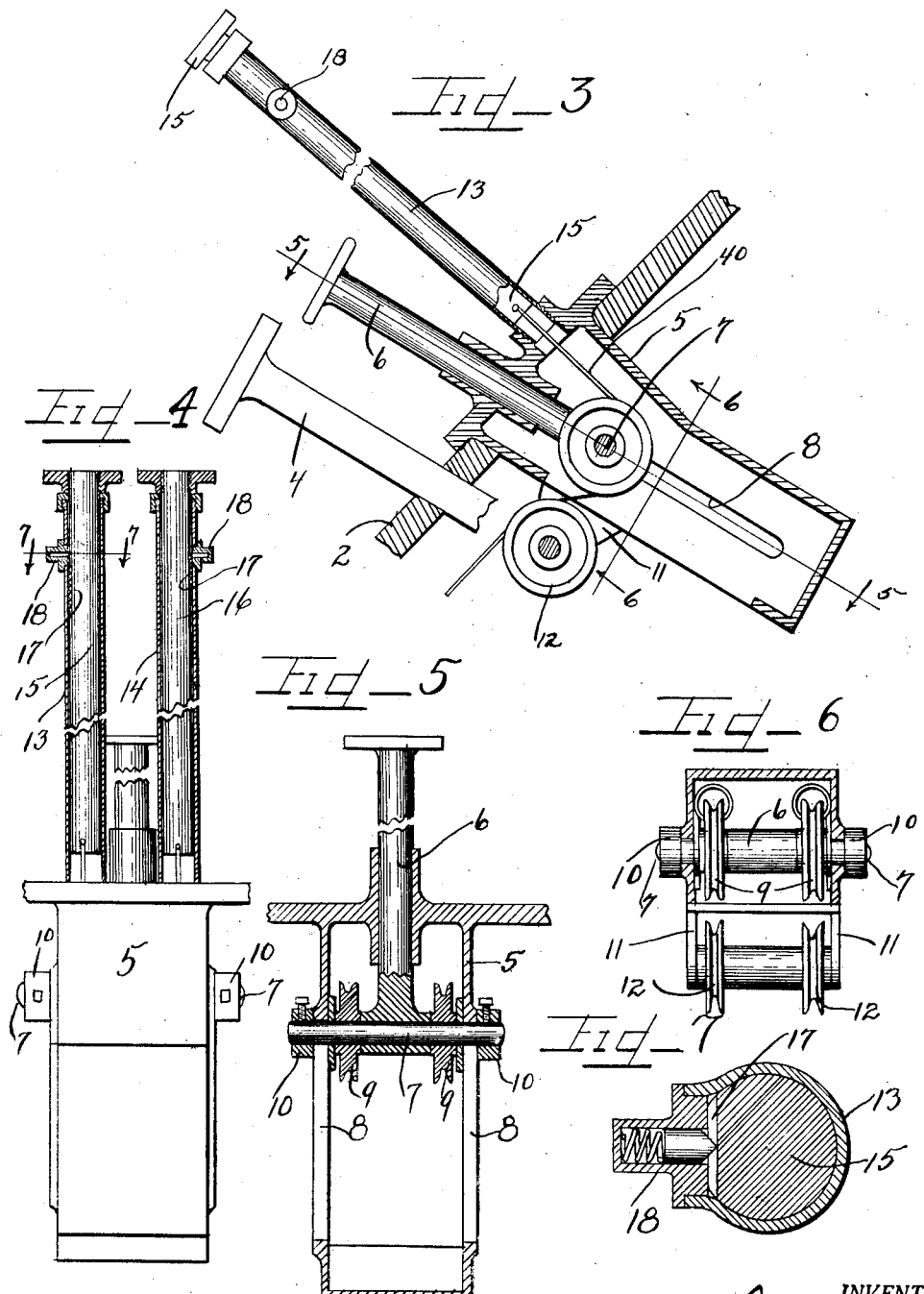

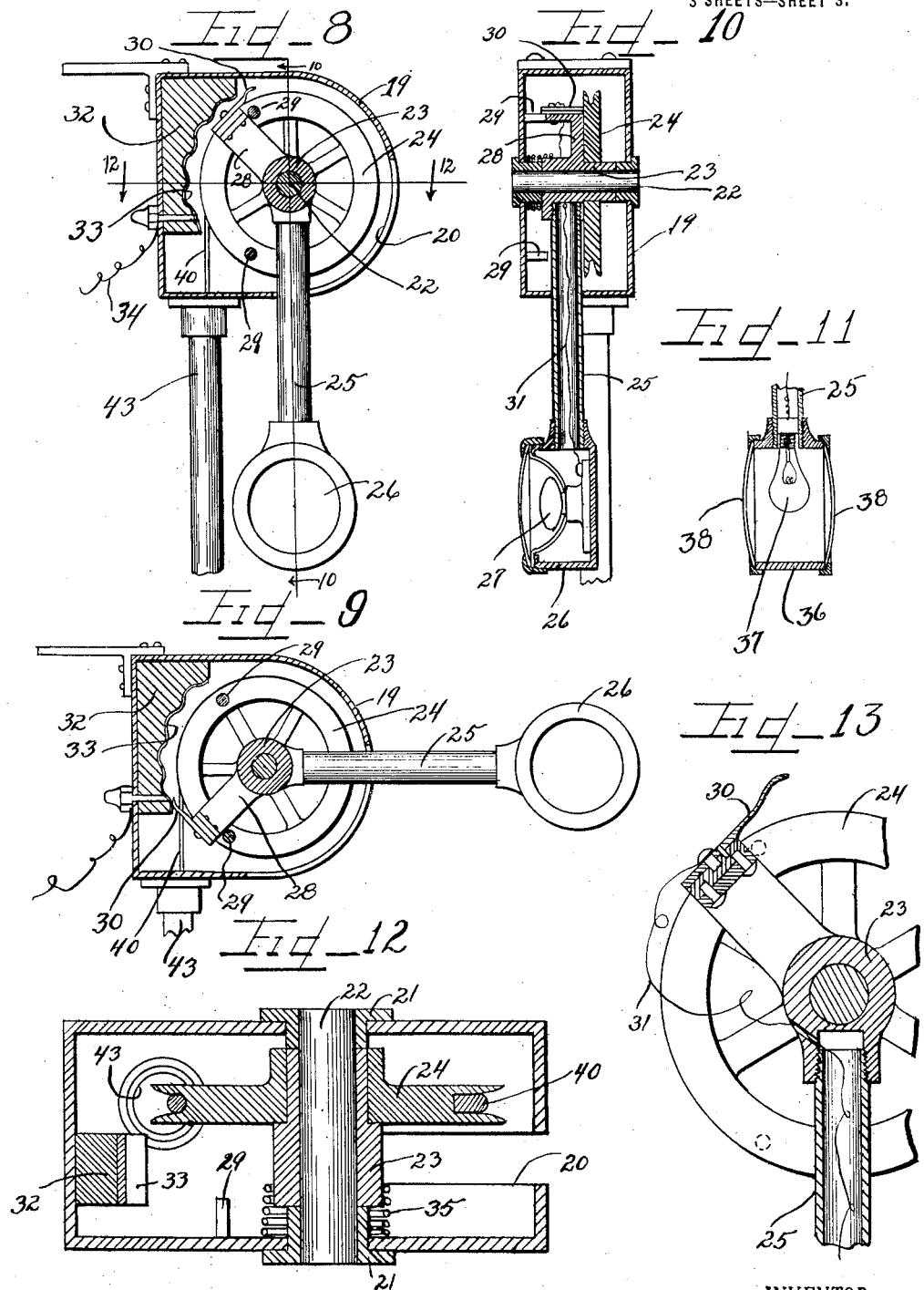

UNITED STATES PATENT OFFICE.

ELGY WIMP, OF CHICAGO, ILLINOIS.

MOTOR-CAR SIGNAL.

1,381,382.  Specification of Letters Patent.  Patented June 14, 1921.

Application filed March 2, 1917. Serial No. 152,057.

*To all whom it may concern:*

Be it known that I, ELGY WIMP, a citizen of the United States, and a resident of the city of Chicago, in the county of Cook and State of Illinois, have invented certain new and useful Improvements in Motor-Car Signals; and I do hereby declare that the following is a full, clear, and exact description of the same, reference being had to the accompanying drawings, and to the numerals of reference marked thereon, which form a part of this specification.

This invention relates to a rear automobile signal for vehicles, and is particularly adapted for use on motor cars to indicate to the drivers of vehicles following the contemplated action of the driver of the vehicle ahead, either in making a right or left turn, or bringing the vehicle to a stop.

It is an object therefore of this invention to construct an automobile signaling device situated for observation either at the front or rear of the car and preferably, though not necessarily, on each side thereof, and actuatable into signaling position from the driver's station in the car.

It is also an object of this invention to construct an automobile signaling device embodying signaling mechanisms mounted one on each side at the rear end of the car, and each actuatable either independently or simultaneously from the driver's station to indicate either a turn or stop to be made.

It is also an object of this invention to construct a motor car signaling device comprising mechanisms mounted at each side of the rear end of the car adapted to be swung upwardly and outwardly into signaling position independently or conjointly, and at night illuminated when swung upwardly into signaling position.

It is a further important object of this invention to construct signaling mechanisms for vehicles comprising independently operable signal arms normally depending at each side of the rear end of the vehicle in position out of use, and adapted to be actuated from the driver's seat in the car either independently by hand operated means or as an incidental operation to actuation of the brake lever or foot pedal so as to be swung upwardly into signaling position, and when desired giving forth a flashing light during movement toward signaling position, and there remaining illumined as a warning to vehicles following.

Other and further important objects of my invention will be evident from the disclosure in the drawings and specification.

The invention (in a preferred form) is illustrated in the drawings and hereinafter more fully described.

On the drawings:

Fig. 3 is a vertical fragmentary sectional detail through the floor board of the car at the driver's station, showing the actuation means for the signaling device.

Fig. 4 is a plan view of the mechanisms shown in Fig. 3, with parts broken away and shown in section.

Fig. 5 is a sectional detail on line 5—5 of Fig. 3, with parts broken away and shown in section.

Fig. 6 is a detail section on line 6—6 of Fig. 3, with parts shown in elevation.

Fig. 7 is an enlarged detail section on line 7—7 of Fig. 4.

Fig. 8 is an interior view with parts broken away and shown in section of one of the signaling mechanisms of the device.

Fig. 9 is a similar view thereof illustrating the signaling arm in signaling position.

Fig. 10 is a detail section on line 10—10 of Fig. 8, with parts in elevation.

Fig. 11 is a fragmentary sectional view similar to Fig. 10, illustrating a modified form of device.

Fig. 12 is a sectional detail on line 12—12 of Fig. 8, with parts omitted and parts in elevation.

Fig. 13 is a fragmentary view with parts in section of the inner mechanism of one of the signaling arms.

As shown on the drawings:

Figure 1:
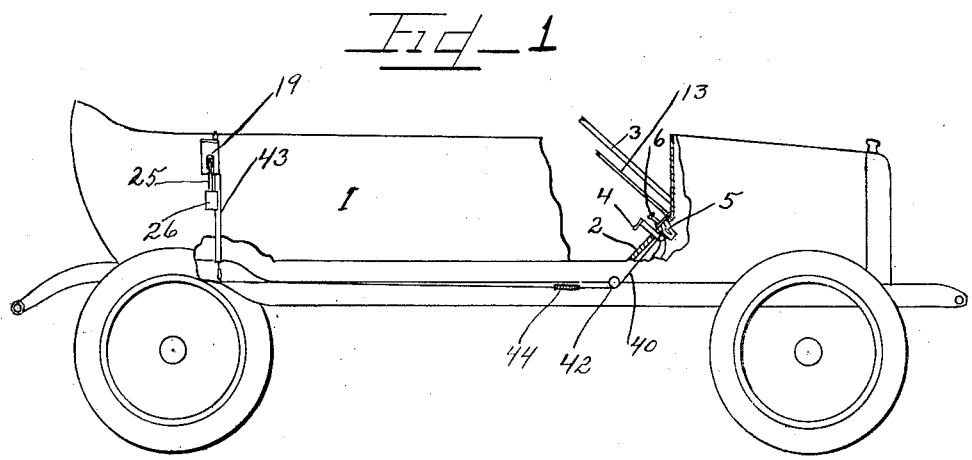
Figure 1 is a fragmentary side elevation of a motor car, partly broken away, illustrating the mechanisms embodying the principles of my invention adapted thereto.

The reference numeral 1, indicates the body of a motor car equipped with a front floor board 2, and a steering column shown fragmentarily and denoted by the reference numeral 3. Mounted to project upwardly through the floor board 2, is a usual brake foot pedal or lever 4, and as clearly shown in Fig. 3, secured in said floor board 2, is a frame or casing member 5, disposed above and forwardly of said brake pedal 4. Slidably mounted through the end of said casing 5, is a pedal 6, which as shown in Figs. 1 and 3, is slightly above the brake pedal 4, but does not extend outwardly as far as said brake pedal 4. Secured transversely through the inner end of said pedal 6, as clearly shown in Fig. 5, is a shaft 7, which extends outwardly at each of its ends through slots 8, provided in the side walls of the casing member 5. Journaled on said shaft 7, on each side of the pedal 6, are sheaves or pulleys 9, and secured upon the outer ends of said shaft 7, are collars 10. Extending downwardly on each side of the casing 5, are brackets 11, and journaled therebetween are pulleys or sheaves 12.

Threaded into the front face of the casing 5, in inclined position are a pair of tubular members denoted respectively by the reference numerals 13 and 14, each provided with a rod or plunger 15 and 16, respectively, slidable therein. As clearly shown in Figs. 3 and 7, one side of each of said plungers 15 and 16, respectively, is notched, as denoted by the reference numeral 17, and spring impelled detents are mounted in small casing elements 18, on the sides of said respective tubular members to engage with said notches when a plunger is pulled outwardly to hold the same in an adjusted position.

Secured upon each side of the body 1, near the rear portion of the car, are casing members 19, each having a slot 20, in one side thereof. Secured through the end of the wall of said casing as shown in Fig. 12, are bushings 21, in which is secured a bearing shaft or pin 22. Journaled on said shaft 22, is a sleeve 23, and secured rigidly thereon is a sheave or pulley 24. Threaded into an extension of said sleeve 23, as clearly shown in Fig. 13, is a depending tubular arm 25, and secured on the lower end thereof is a lamp casing 26, within which an electric bulb 27, is mounted. Said arm 25, extends through the slot 20, and is adapted to swing from the depending position out of use shown in Fig. 8, up and outwardly into the signaling position shown in Fig. 9. Formed upon said sleeve 23, is a short arm or crank 28, disposed within the casing 19, which serves as a counterweight for the arm 25, and is limited in its movement by fixed pins 29, secured on the side walls of the casing thereby limiting the movement of the signaling arm 25. Mounted in insulated relation on the end of the arm 28, is a contact brush 30, and a conductor wire 31, leads therefrom and inwardly through a slot in the extension of the sleeve 23, into the interior of the tubular arm 25, and downwardly to the lamp 27, the other terminal of the lamp 27, being grounded. An insulating block 32, is mounted within the casing 19, and secured thereover, is an irregular conductor contact 33, adapted to be intermittently contacted by the brush 30, as the same sweeps thereover to flash the lamp 27, at the end of the signal arm as the signal arm swings upwardly into signaling position. When this position is reached, the contact 30, remains against the contact 33, to give a steady illumination of the lamp 27. The wire 34, in circuit with the contact 33, leads to any suitable source of E. M. F., the other terminal of which is grounded upon the frame of the motor car. As shown clearly in Fig. 12, a coil spring 35, is wound about the sleeve 23, attached thereto and to the casing, and acts normally to swing said signal arm 25, downwardly and into position out of use such as shown in Fig. 8.

In the modified form of device illustrated in Fig. 11, I have shown attached on the end of the arm 25, a lamp casing 36, with a lamp 37, mounted centrally therein and with lenses 38, mounted on both the front and rear ends of the casing so that the signal when illuminated is visible both from the front and rear of the vehicle. Attached to each of the plungers 15 and 16, respectively, are cables 40 and 41, which are trained around their respective pulleys 9 and 12, and lead rearwardly about suitable guide pulleys 42, into tubular upright guide members 43, which are secured beneath each of the signal casings 19, and said cables lead into said casing and are there connected each to its respective sheaves or pulleys 24. Springs 44, are connected into each of the cables 40 and 41, adapted to be extended to allow for extreme movements of the actuating means exceeding the movement required to swing the signal arms into signaling position.

The operation is as follows:

When the respective signal arms are in position out of use, they are in the depending position shown in Fig. 8. When the operator desires to signal a turn either to the left or right, one or the other of the plungers 15 or 16, as the case may be, is pulled outwardly thereby tensioning one or the other of the cables 40 or 41, which serves to rotate the pulley 24, in one of the casings to swing the signal arm 25, upwardly into signaling position. If a left turn is to be made, the signal arm on the left side of the car is actuated, and conversely when a right turn is to be made the signal arm on the right side of the car is swung upwardly into signaling position. The arm is again brought down by thrusting the proper plunger inwardly again into its tubular guide or casing, thus permitting retractive movement of the respective cables under the stress of the winding spring 35, within the signal casing by which the arm is caused to swing back into position out of use when released. If the operator depresses the brake pedal 4, due to the fact that the pedal 6, is positioned slightly back of and above the same, as an incidental operation to the actuation of the pedal 4, if the operator so desires, the toe of the foot may be caused to likewise depress the pedal 6. This causes the pulleys 9, to be moved inwardly through the casing 5, and inasmuch as the plungers 15 and 16, are held stationary, the cables 40 and 41, will be actuated to cause both of the signal arms 25, on the left and right hand side of the car to be swung upwardly, and actuation of both thereof will indicate to a vehicle following that a stop is contemplated. Of course, release of the brake pedal 4, will also cause release of the pedal 6, and the winding springs 35, in the signal casings will serve to return the signal arms downwardly into position out of use, and coincident therewith return the pedal 6, to initial position. The springs connected into each of the cables 40 and 41, permit any extreme movement of the pedal 6, or plungers 15 and 16, to be taken up, after the signal arms 25, have been swung upwardly into signaling position. That is to say, for very slight movements of the pedal 6, under initial pressures on the brake pedal 4, the signal arms will be caused to swing upwardly and further depressions of the pedal 6, or actuations of the plungers 15 and 16, will merely serve to extend the springs connected into said cables.

The detents associated with the guide for the plungers 15 and 16, serve to hold said plungers in different adjusted positions, and return of the plungers may be caused to take place by thrusting the same inwardly or by depressing the pedal 6, which will tension the cables and thus overcome the spring retaining effect of the detents to return the plungers to initial position.

Figure 2:
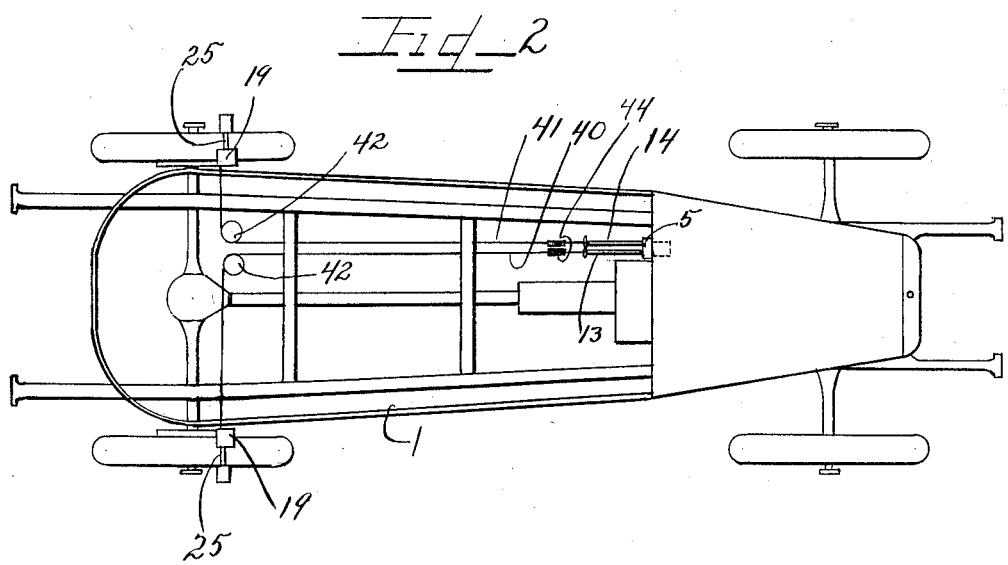
Fig. 2 is a top plan view of the motor car showing the body shell on the chassis, and with parts omitted and broken away to show the construction.

Due to the fact that the brush contact 30, for the lamp in the end of a signal arm strikes the conductor contact 33, only at intervals during the movement of the signal arm upwardly into signaling position, the lamp will be caused to flash as the arm swings upwardly and to be steadily illumined after the arm has moved into its signaling position. Of course, it is to be understood that the signal arms can as well be attached on each side of the windshield of the motor car if so desired instead of the position shown in Figs. 1 and 2.

I am aware that various details of construction may be varied through a wide range without departing from the principles of this invention and I therefore do not purpose limiting the patent granted otherwise than necessitated by the prior art.

I claim as my invention:

1. In a signal device of the class described, a casing rectangular on one side and semi-circular on the other having a quadrantal slot in the semi-circular portion, a signal arm pivotally mounted in said casing projecting through said slot, an illuminating means in the end of said arm, a wheel rigidly secured to said arm, an operating tension member secured to the periphery of said wheel for turning the wheel and thereby swinging the arm, a counterweight connected with said arm at an angle of about 135°, a quadrantal contact arranged within and attached to the rectangular portion of the casing, and a contact brush adapted to engage the quadrantal contact when said arm is swung upwardly and thereby produce illumination of the illuminating means.

2. In a signal device of the class described, a casing having a quadrantal slot therein, a signal arm projecting through said slot, means connected therewith to swing the arm from a pendent position into horizontal signaling position, illuminating means in said arm, a counterweight connected thereto at an angle of about 135°, a quadrantal contact secured to said casing and a contact brush secured to said counterweight adapted to engage the quadrantal contact when said arm is swung upwardly, said quadrantal contact having a series of projections thereon to produce intermittent contact with said brush and thereby intermittent illumination of the illuminating means as the arm moves upwardly.

In testimony whereof I have hereunto subscribed my name in the presence of two subscribing witnesses.

ELGY WIMP.

Witnesses:
 LAWRENCE REIBSTEIN,
 CHARLES W. HILLS, Jr.